United States Patent [19]
Wilcox

[11] Patent Number: 4,887,802
[45] Date of Patent: Dec. 19, 1989

[54] LEAF SPRING ASSEMBLIES

[75] Inventor: Lester T. Wilcox, Wolverhampton, United Kingdom

[73] Assignee: GKN Technology Limited, West Midlands, England

[21] Appl. No.: 246,301

[22] PCT Filed: May 29, 1987

[86] PCT No.: PCT/GB87/00372
§ 371 Date: Sep. 12, 1988
§ 102(e) Date: Sep. 12, 1988

[87] PCT Pub. No.: WO87/07226
PCT Pub. Date: Dec. 3, 1987

[30] Foreign Application Priority Data
May 31, 1986 [GB] United Kingdom ................ 8613262
Jul. 17, 1986 [GB] United Kingdom ................ 8617506

[51] Int. Cl.$^4$ ............................................. F16F 1/36
[52] U.S. Cl. ..................................... 267/148; 267/262
[58] Field of Search ................ 267/148, 149, 262, 269

[56] References Cited
U.S. PATENT DOCUMENTS 2,776,135 1/1957 Assmus ........................... 267/262 X
4,505,460 3/1985 LeGallais ........................ 267/149 X
4,556,204 12/1985 Pflederer ............................ 267/148
4,611,793 9/1986 Nishiyama et al. ............. 267/149 X

FOREIGN PATENT DOCUMENTS 5916 12/1979 European Pat. Off. ............ 267/149
686115 7/1930 France ................................ 267/262
55-86934 7/1980 Japan .
56-141434 11/1981 Japan .
8500643 2/1985 PCT Int'l Appl. .
8604864 8/1986 PCT Int'l Appl. .
2123521 2/1984 United Kingdom ................ 267/148
8602601 5/1986 World Int. Prop. O. .

Primary Examiner—George E. A. Halvosa
Attorney, Agent, or Firm—Marshall, O'Toole, Gerstein, Murray & Bicknell

[57] ABSTRACT

A leaf spring of composite material has a slipper end assembly comprising two members engaging opposite surfaces of the spring leaf and extending beyond the free end of the spring leaf where they are secured together. Away from the free end of the leaf they are held together by a fastening extending transversely around them and the spring. The spring has a curved portion at its free end, with which the members interfit to prevent their moving relative to the spring. In an assembly of such a leaf with a spring leaf of steel, one of the members held to the spring may engage the steel leaf to hold the leaves in alignment with one another.

7 Claims, 2 Drawing Sheets

LEAF SPRING ASSEMBLIES

This invention relates to leaf springs made of composite (fibre-reinforced plastics) material. More particularly the invention relates in its broadest aspect to the attachment to such a leaf spring, adjacent an end thereof, of a member affording a wear resistant surface.

Leaf springs are commonly used in the suspension of motor vehicles. In a typical installation, the leaf spring may be required to have a so-called "slipper end", which is a means by which the change in the straight-line distance between the ends of the spring can be accommodated as the configuration of the spring changes with changes in the load it is bearing. One end of the spring may be pivotally mounted at a fixed position to the chassis or body structure of the vehicle, and the other end of the spring bears against a supporting surface relative to which it has sliding movement, lengthwise of the spring, as the spring load changes. If the spring comprises two or more individual leaves, relative sliding movement is also required between such individual leaves as their configuration changes under changing load conditions.

In leaf springs made of steel, it is usual to arrange for such sliding movement to occur directly on the surface of the spring leaf or leaves. The resistance of the spring leaves to abrasion is adequate for this purpose. In the case of leaf springs made of composite material, however, the resistance of the spring material to abrasion is not satisfactory, particularly if the spring is operating in a dirty environment as would be the case in a motor vehicle. Accordingly it is desirable to provide a composite leaf spring with an element of an appropriate wear resistant material at any point where relative sliding movement is likely to occur. It is difficult satisfactorily to attach such a wear resistant element to a composite spring in a manner which does not take up excessive space and yet is reliable. It has been found that the use of adhesives alone for such purpose is not satisfactory in service, and any method involving the provision of a hole or holes in the spring is not acceptable because of the detrimental effect on the properties of the spring caused thereby.

It is the broadest object of the present invention to provide for effective attachment to the end of a leaf spring of composite material of a member affording a wear resistant surface.

Therefore, according to the invention, we provide a spring comprising an elongate leaf of composite material provided, adjacent a free end thereof, with a first member and a second member extending along respective oppositely facing surfaces of the leaf, the members extending lengthwise of the leaf and being secured together beyond the free end thereof, and being secured to the leaf at a position spaced from said free end by a fastening element extending transversely around the leaf, the members and leaf having formations which interfit to prevent relative movement lengthwise of the spring therebetween, and at least one of the members affording a wear resistant surface.

In a spring according to the invention, the securement of the members to one another beyond the free end of the spring, and to the spring by a transverse fastening element spaced from the free end of the spring, has the advantageous result that the assembly does not occupy a large volume such as may make installation in a motor vehicle (or any other required apparatus or equipment) difficult, and yet the members are firmly attached in such a manner that they cannot readily be detached in use. It is not necessary to provide a hole or holes in the spring, and hence the problems which would be caused thereby are overcome.

Preferably the interfitting formations of the spring and members comprise a curved portion of the spring adjacent the free end thereof, and complementary curved portions of the members. It is relatively easy to provide a leaf spring of composite material, which typically is made by a process involving a moulding step to form the spring to its final shape, with a suitably curved portion adjacent its free end, and it is equally easy to provide the members secured to the spring, which conveniently are metal, e.g. steel, pressings, with complementary curved shapes.

The fastening element may comprise an endless metal loop extending around the members and the spring leaf, which loop may be deformed to tighten it and to engage with formations provided on the members such that it cannot accidentally be displaced therefrom lengthwise of the spring. In one of the embodiments described hereafter, the fastening element is integral with one of the members.

Although it would be within the scope of the invention for the surface of one or more of the members itself to constitute the wear resistant surface, said at least one member itself preferably carries a bearing member of a suitable wear resistant material, e.g. of steel. Such a bearing member may afford a flat wear resistant surface, and may have an elastomeric element interposed between it and the member secured to the spring leaf.

A further aspect of the invention is particularly concerned with a leaf spring assembly comprising a first leaf which is provided at its ends with means for attachment to a motor vehicle where the spring assembly is to be used, and a second leaf of composite material and secured to the first leaf at a position between the ends thereof, end portions of the second leaf bearing against end portions of the first leaf. In such a spring assembly, the first leaf may be of composite material or, preferably, is of metal.

In such a spring assembly, the second spring leaf assists the first spring leaf, and even when the first spring leaf is of steel there is still an appreciable weight saving compared with a spring of similar performance of which all the leaves are of steel. One difficult design problem in connection with multi-leaf springs of which all the leaves are of composite material is that of providing means for attachment to a motor vehicle, and if the first leaf is of steel this problem can be avoided since the steel leaf can simply have each end formed as a scroll to provide an aperture to receive a mounting bolt or the like. However, the steel and composite leaves must be held together between their ends (at which point an axle or like component is also secured), and it is necessary to ensure that the leaves remain in the correct alignment relative to one another. Particularly, a condition known as "scissoring" in which the leaves pivot relative to one another about their centre region such that their ends are not in alignment, must be resisted. In an all steel spring, brackets for preventing scissoring can be riveted to one or more spring leaves, but such expedients, as above described, cause difficulties with spring leaves of composite material. The requirement for presenting scissoring is additional to that of preventing wear due to rubbing at the ends of the spring leaves.

The invention therefore further provides a leaf spring assembly comprising a first leaf; and a second leaf of composite material, wherein the second leaf is provided with members according to the invention as above described, one of said members having portions which are engagable with the first leaf to hold the first and second leaves in alignment with one another.

Such portions may comprise brackets arranged to constrain the first and second leaves relative to one another.

In the embodiments of this aspect of the invention as described hereafter, the first spring leaf is of steel, formed at its ends to provide for attachment to a vehicle.

The invention will now be described by way of example with reference to the accompanying drawings, of which:

Figure 1:
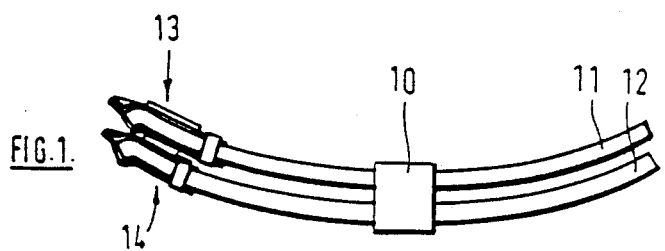
FIG. 1 is a diagrammatic elevation showing an assembly of two spring leaves according to the invention.

Referring firstly to FIG. 1 of the drawings, there is shown diagrammatically an assembly comprising two spring leaves 11, 12. The leaves are made of composite, fibre-reinforced plastics, material. They are held together in a region adjacent their mid-points, by a structure indicated in outline at 10, which may comprise, in known manner, generally U-shaped bolts and appropriate spacers and clamping members. In a typical installation in a motor vehicle, the structure 10 will also provide for attachment of an axle component to the springs. The one pair of adjacent ends of the leaves is provided with "slipper end" bearing assemblies 13, 14 as shown in greater detail in FIG. 2. The other ends of the spring leaves may be similarly provided if they are additional or "helper" leaves to a main spring leaf not shown, or otherwise may be arranged to be attached to the vehicle.

Figure 2:
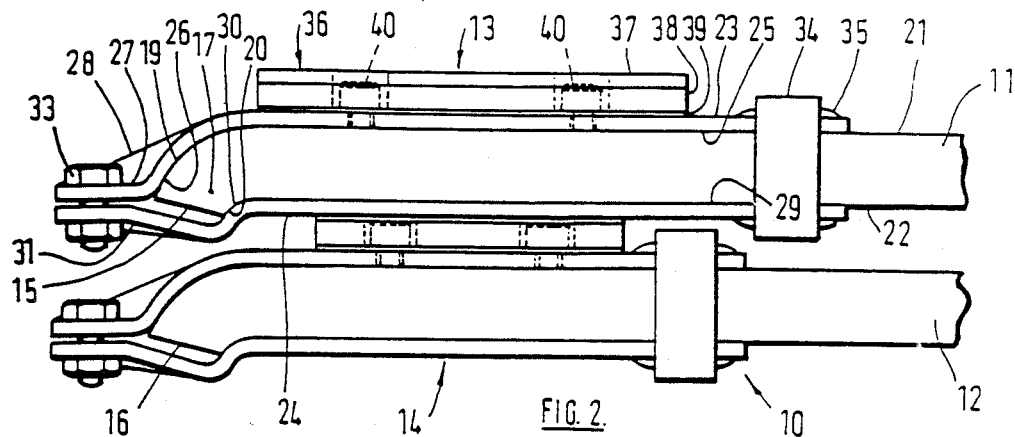
FIG. 2 is a detailed elevation of part of the assembly of FIG. 1.

Referring now to FIG. 2 of the drawings, the illustrated assembly comprises the two spring leaves, namely upper leaf 11 and lower leaf 12 of composite (fibre reinforced plastics) material. Each leaf 11, 12 carries a bearing assembly 13, 14 at one free end 15, 16 so that the lower leaf 12 may slide against the upper leaf 11 and so that the upper leaf 11 may slide against part of the vehicle structure (not shown).

The respective bearing assemblies 13, 14 of the upper and lower leaves are substantially identical so only the bearing assembly 13 of the upper leaf 11 will be described in detail.

The leaf 11 is rectangular in cross section and generally elongate. The portion 17 of the leaf 11 immediately adjacent to its free end 15 curves downwardly so that the corresponding portions 19, 20 of its upper and lower surfaces 21, 22 are convex and concave respectively.

The bearing assembly 13 comprises a first pressing 23 and a second pressing 24. The first pressing 23 comprises a flat portion 25 which contacts the flat upper surface 21 of the leaf 11; a curved portion 26 which contacts the convex portion 19 of the upper surface 21 of the leaf 11; and a flange 27 which projects lengthways of the leaf 11 beyond the free end 15 thereof. The flange 27 is provided with a web 28 to improve its rigidity.

The second pressing 24 comprises; a flat portion 29 which contacts the flat lower surface 22 of the leaf 11; a curved portion 30 which contacts the concave portion 20 of the lower surface 22; and a flange 31 which projects lengthways of the leaf 11 beyond the free end 15 thereof.

The first and second pressings 23, 24 are secured together beyond the free end 15 of the leaf 11 by bolts, one of which is shown at 33, passing through the flanges 27, 31. Alternative fastenings, e.g. rivets or welding, could be used to hold the pressings 23, 24 together beyond the free end of the leaf. The pressings are further secured together by a strap 34 which encircles the leaf 11 and the pressings at a position remote from the leaf free end 15. The pressings 23, 24 are provided with projections or formations 35 which define a recess for positioning the strap 34.

The strap 34 preferably is an endless metal band shaped such that it is able to be moved into position lengthwise of the spring over the projections 35 to hold the pressings 23, 24 to the spring. The strap can then be deformed into the recess between projections 35, for example by means of a press, so that it maintains its position.

The curved portion 17 of the leaf 11 and the complementary shapes of the pressings 23, 24 prevent movement of the bearing assembly 13 lengthwise of the leaf 11.

A bearing or slipper member shown generally as 36 is secured to the upper pressing 23. The bearing member 36 comprises a pad 37 of wear resistant steel bonded to a supporting pad 38 of elastomeric material. The supporting pad 38 in turn is bonded to a metal plate 39 which is held to the first pressing 23 by means of bolts 40. A similar bearing member is secured to the upper pressing of the lower spring leaf 12, and bears against the lower pressing 24 of the leaf 11. Such bearing members on the upper pressings may be simple steel pads secured directly to the pressings, and not incorporate an elastomeric pad as 38.

Alternatively, rubbing may take place directly on the surfaces of the upper pressings, as 23, of the spring leaves.

Figure 3:
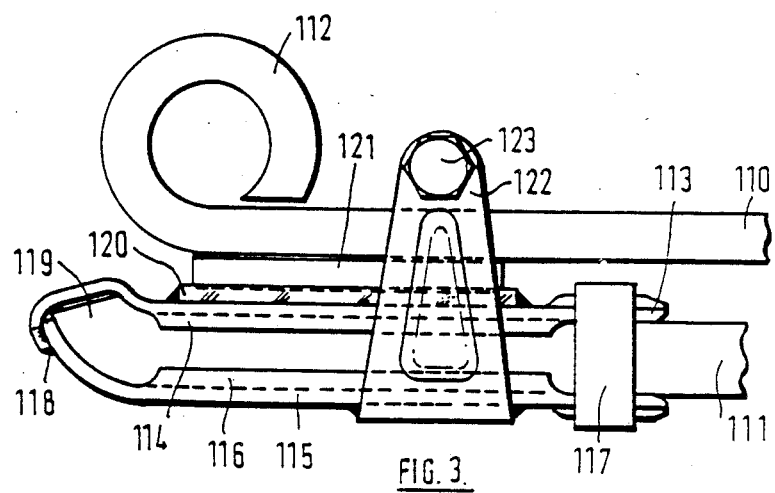
FIG. 3 is an elevation of part of a further embodiment of spring assembly according to the invention.

Referring now to FIG. 3 of the drawings, there is shown part of a leaf spring assembly comprising a first leaf 110 and a second leaf 111. The first leaf 110 is of steel, and has its end portion 112 formed as a scroll to provide a transversely extending aperture for receiving a bush and a mounting bolt for securing the spring to a vehicle. The second leaf 111 is of composite, fibre-reinforced plastics, material and would be secured to the first leaf 110 at a position generally centrally between the ends of the leaves.

The second, composite, leaf 111 is provided with means for resisting wear of the end portion thereof when relative movement longitudinally of the leaves occurs between the first and second leaves as they bend in use. Such wear resisting means is generally as shown in FIG. 2, but nevertheless will be described in detail. A sheet metal member 113 lies on the upper surface of the end portion of leaf 111, and has downwardly extending flanges one of which is indicated at 114, engaging the side faces of the leaf to prevent it from becoming displaced transversely of the leaf. A further sheet metal member 115, with upwardly extending flanges 116, is provided at the lower surfaces of the leaf 111. The sheet metal members 113, 115 are held together and to the spring leaf 111 at a position away from the end of the leaf by a transversely extending annular metal strap or loop 117. At the free end of the leaf, the members 113, 115 are welded together at 118, and the extreme free end of the leaf 111 is upturned at 119 to interfit with the members 113, 115 so that they cannot move relative to the leaf longitudinally thereof.

A plate 120 is welded to the upper surface of member 113, and a bearing member 121 is provided thereon to contact the lower surface of the first leaf 110. The bearing member 121 may be, for example, of metal, of a suitable wear resistant plastics material, or possibly a metal-rubber-metal sandwich. The bearing member 121 is selected to provide acceptable wearing properties when subjected to rubbing, under load, lengthwise of the leaf 110.

To keep the leaves 110, 111 in alignment with one another, member 115 is provided, at each side, with a bracket 122 which extends upwardly to a position above the leaf 110. The brackets 122 extend at a small clearance from the sides of the leaf 110, and are connected together above the leaf 110 by a bolt 123. Thus, any tendency for the end portions of leaves 110, 111 to become displaced transversely relative to one another is resisted by the leaf 110 abutting one or other of the brackets 122. In the illustrated embodiment, brackets 122 are integral with one another in the form of a generally U-shaped piece of sheet metal.

Figure 4:
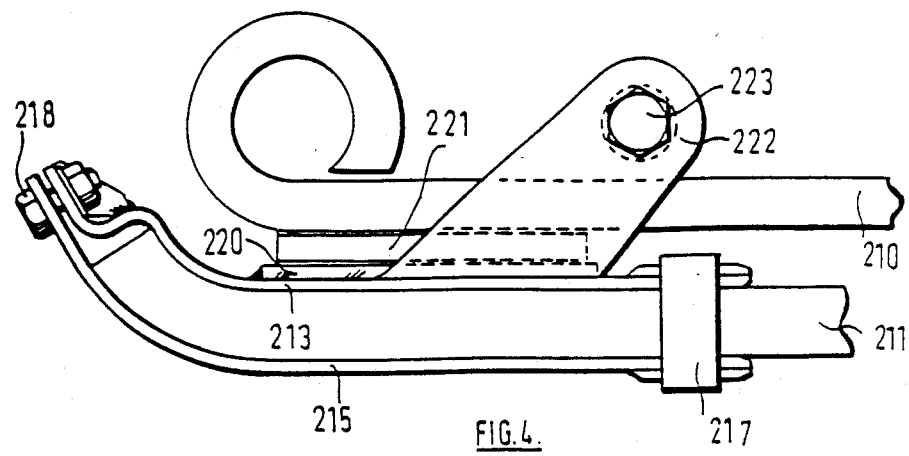
FIGS. 4 and 5 are corresponding elevations of two yet further embodiments of spring assembly according to the invention.

Referring now to FIG. 4 of the drawings, this shows two leaves 210, 211 which, as in the embodiment of FIG. 3, are of steel and composite material, respectively. The configuration of the leaves is generally the same as that of FIG. 3 except that lower (composite) leaf 211 has its end portion extended upwardly farther than the end portion of leaf 111, to be able to engage the mounting for the spring assembly on the vehicle and provide some security in the event of failure of leaf 210. Upper and lower sheet metal members 213, 215 are provided for the leaf 211, held together by a transversely extending annular strap 217 away from the free end of the leaf, and a bolt 218 beyond such free end. As in the embodiment of FIG. 3, member 213 has a plate 220 and bearing member 221.

In this embodiment, plate 220 is provided with upstanding brackets 222 which extend above leaf 210 and are engagable with the sides thereof to prevent relative misalignment between the leaves. Brackets 222 are secured together above leaf 210 by a bolt 223.

Figure 5:
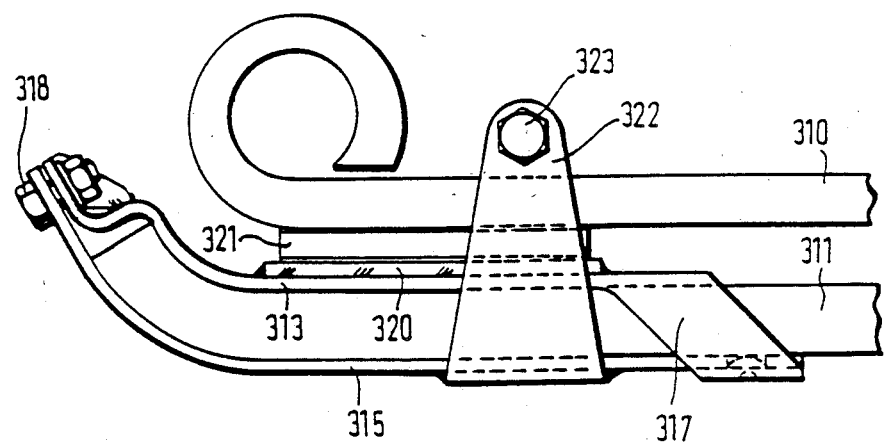

Referring now to FIG. 5 of the drawings, there is shown an embodiment with first and second leaves 310, 311 as for FIG. 4. Leaf 311 has upper and lower sheet metal members 313, 315, secured together and to the leaf by a bolt 318 and a transversely extending strap which in this embodiment is integral with element 313. The configuration of strap 317 is such that it can be fitted over the end portion of leaf 311 while being held at an inclination thereto, and is tightened about the leaf when the element is moved to the illustrated position. Member 313 is provided with plate 320 and bearing member 321.

In this embodiment, member 315 is provided with upstanding brackets 322, held together by bolts 323, as in the embodiment of FIG. 3.

The embodiments of the invention of FIGS. 3-5 thus provide the parts, present to prevent wear of the composite leaf of the spring assembly, with portions which effectively prevent misalignment occuring between the leaves in the assembly. The complexity of the assembly is not greatly increased, nor is the cost thereof.

The invention is also applicable to assemblies in which more than two leaves are provided, with brackets as 122, 222, 322 of suitable dimensions to hold all the leaves of the assembly together against misalignment.

I claim:

1. A spring comprising an elongate leaf made of fibre-reinforced plastics material and having a free end;

the spring having, adjacent the free end, a portion affording oppositely facing generally flat surfaces extending lengthwise of the spring, and at the free end a portion which is curved relative to the adjacent portion of the spring to afford concave and convex surfaces as continuations of the generally flat oppositely facing surfaces;

a first member extending lengthwise of the spring along and in face-to-face engagement with one of the oppositely facing generally flat surfaces and one of the concave and convex surfaces of the spring, and extending beyond the free end of the spring;

a second member extending lengthwise of the spring along and in face-to-face engagement with the other of the oppositely facing generally flat surfaces and the other of the concave and convex surfaces of the spring, and extending beyond the free end thereof;

fastening means securing the first and second members together at a position beyond the free end of the spring;

a fastening element comprising a metal loop extending around both the first and second members and with a portion of the spring therebetween, at a position spaced lengthwise of the spring from the free end thereof, the first and second members having retention formations and the loop being deformed into engagement with the retention formations to prevent displacement of the loop therefrom; and at least one of the first and second members being provided, between the fastening means beyond the free end of the spring and the fastening element metal loop, with a wear-resistant bearing surface for sliding engagement.

2. A spring assembly comprising a first spring leaf according to claim 1 and a second spring leaf, the spring leaves being held together at a central region between the ends thereof, wherein the wear resistant bearing surface of the first spring leaf abuts a facing surface of the second spring leaf.

3. A spring assembly according to claim 2 wherein one of the first and second members of the first spring leaf includes portions engaging the second spring leaf to hold the leaves in alignment with one another.

4. An assembly according to claim 3 wherein the portions comprise upstanding brackets which are connected together by a fastening means located at a side of the second spring leaf opposite from the side of the second leaf surface whch faces the first spring leaf.

5. A spring comprising an elongate leaf made of fibre-reinforced plastics material and having a free end;

the spring having, adjacent the free end, a portion affording oppositely facing generally flat surfaces extending lengthwise of the spring, and at the free end a portion which is curved relative to the adjacent portion of the spring to afford concave and convex surfaces as continuations of the generally flat oppositely facing surfaces;

a first member comprising a metal pressing extending lengthwise of the spring along and in face-to-face engagement with one of the oppositely facing generally flat surfaces and one of the concave and convex surfaces of the spring, beyond the free end of the spring;

a second member comprising a metal pressing extending lengthwise of the spring along and in face-to-face engagement with the other of the oppositely facing generally flat surfaces and the other of the concave and convex surfaces of the spring, and extending beyond the free end thereof;

fastening means securing the first and second members together at a position beyond the free end of the spring;

a fastening element comprising a metal loop extending around both the first and second members with a portion of the spring therebetween, at a position spaced lengthwise of the spring from the free end thereof, the first and second members having retention formations and the loop being deformed into engagement with the retention formations to prevent displacement of the loop therefrom; and at least one of the first and second members being provided, between the fastening means beyond the free end of the spring and the fastening element metal loop, with a bearing member affording a wear-resistant bearing surface for sliding engagement.

6. A spring according to claim 5 wherein the bearing member comprises a metal plate with an elastomeric element therebeneath.

7. A spring comprising an elongate leaf made of fibre-reinforced plastics material and having a free end;

the spring having, adjacent the free end, a portion affording oppositely facing generally flat surfaces extending lengthwise of the spring, and at the free end a portion which is curved relative to the adjacent portion of the spring to afford concave and convex surfaces as continuations of the generally flat oppositely facing surfaces;

a first member extending lengthwise of the spring along and in face-to-face engagement with one of the oppositely facing generally flat surfaces and one of the concave and convex surfaces of the spring, and extending beyond the free end of the spring;

a second member extending lengthwise of the spring along and in face-to-face engagement with the other of the oppositely facing generally flat surfaces and the other of the concave and convex surfaces of the spring, and extending beyond the free end thereof;

the first member and the second member being individual pieces;

fastening means securing the first and second members together at a position outward of the free end of the spring;

a fastening element securing the first and second members together with a portion of the spring therebetween, at a position spaced inward of the spring free end; and at least one of the first and second members being provided, between the fastening means outward of the free end of the spring and the fastening element inward of the free end of the spring, with a wear-resistant bearing surface for sliding engagement.

* * * * *